(12) United States Patent
Chen

(10) Patent No.: US 10,379,593 B2
(45) Date of Patent: Aug. 13, 2019

(54) IMAGE DISPLAYING APPARATUS AND METHOD OF OPERATING THE SAME

(71) Applicant: SAMSUNG ELECTRONICS CO., LTD., Suwon-si (KR)

(72) Inventor: Xiaoxiao Chen, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 15/331,994

(22) Filed: Oct. 24, 2016

(65) Prior Publication Data

US 2017/0115722 A1  Apr. 27, 2017

(30) Foreign Application Priority Data

Oct. 23, 2015 (CN) .......................... 2015 1 0697510
Oct. 10, 2016 (KR) ........................ 10-2016-0130831

(51) Int. Cl.
*G06F 1/32* (2019.01)
*G09G 5/14* (2006.01)
(Continued)

(52) U.S. Cl.
CPC .......... *G06F 1/3265* (2013.01); *G06F 1/3212* (2013.01); *G06F 1/3231* (2013.01); *G06F 3/0481* (2013.01); *G09G 5/14* (2013.01); *G09G 5/391* (2013.01); *G06F 2203/04803* (2013.01); *G09G 2330/022* (2013.01); *G09G 2330/023* (2013.01); *G09G 2340/0407* (2013.01);
(Continued)

(58) Field of Classification Search
CPC .... G06F 1/3212; G06F 1/3231; G06F 1/3265; G06F 3/0481; G09G 5/14; G09G 5/391

USPC .......... 345/1.1, 101, 204–211, 643; 715/790; 709/203; 358/1.6

See application file for complete search history.

(56) References Cited

U.S. PATENT DOCUMENTS 6,239,787 B1 * 5/2001 Sugaya .................. G08B 5/226
  345/102
6,326,943 B1 * 12/2001 Inoue ................... G09G 3/3629
  345/101

(Continued)

FOREIGN PATENT DOCUMENTS

CN  1283296 A  2/2001
CN  1517859 A  8/2004

(Continued)

OTHER PUBLICATIONS

Search Report (PCT/ISA/210) dated Jan. 17, 2017, issued by the International Searching Authority in counterpart International Patent Application No. PCT/KR2016/011877.

(Continued)

*Primary Examiner* — Prabodh M Dharia
(74) *Attorney, Agent, or Firm* — Sughrue Mion, PLLC

(57) ABSTRACT

A method of controlling a display, performed by an image displaying apparatus, includes acquiring a screen parameter corresponding to an application that is being executed in a terminal, determining a partial region from within an entire region of a display of the terminal based on the acquired screen parameter, interrupting a supply of power to a remaining region of the entire region of the display except for the determined partial region, and displaying an execution window of the application in the determined partial region.

16 Claims, 20 Drawing Sheets

(51) Int. Cl.
*G09G 5/391* (2006.01)
*G06F 3/0481* (2013.01)
*G06F 1/3234* (2019.01)
*G06F 1/3212* (2019.01)
*G06F 1/3231* (2019.01)

(52) U.S. Cl.
CPC . *G09G 2340/0464* (2013.01); *G09G 2340/10* (2013.01); *G09G 2354/00* (2013.01); *Y02D 10/153* (2018.01); *Y02D 10/173* (2018.01); *Y02D 10/174* (2018.01)

(56) References Cited

U.S. PATENT DOCUMENTS

| | | | |
|---|---|---|---|
| 8,555,194 | B2 | 10/2013 | Nason et al. |
| 8,836,654 | B2 | 9/2014 | Oguz |
| 2003/0135288 | A1 | 7/2003 | Ranganathan et al. |
| 2006/0010230 | A1* | 1/2006 | Karklins ............... G05B 19/05 709/223 |
| 2006/0028661 | A1* | 2/2006 | Uruma ............... H04N 1/00408 358/1.6 |
| 2006/0136828 | A1* | 6/2006 | Asano ................. G06F 3/1454 715/733 |
| 2006/0139379 | A1* | 6/2006 | Toma ....................... G06T 3/40 345/698 |
| 2008/0141049 | A1 | 6/2008 | Hassan et al. |
| 2008/0160392 | A1* | 7/2008 | Toya ..................... H01M 2/027 429/90 |
| 2008/0177994 | A1* | 7/2008 | Mayer ................... G06F 9/4418 713/2 |
| 2008/0250494 | A1* | 10/2008 | Nagata ................. G06F 218/34 726/19 |
| 2009/0184935 | A1* | 7/2009 | Kim ....................... G06F 3/0416 345/173 |
| 2009/0244048 | A1 | 10/2009 | Yamanaka |
| 2010/0039566 | A1 | 2/2010 | Kim et al. |
| 2010/0077337 | A1* | 3/2010 | Yang ....................... G06F 1/266 715/771 |
| 2010/0103098 | A1* | 4/2010 | Gear ....................... G06F 1/1626 345/158 |
| 2010/0245102 | A1* | 9/2010 | Yokoi ................. H01M 10/488 340/636.16 |
| 2011/0010642 | A1* | 1/2011 | Nagai ..................... G06F 9/455 715/760 |
| 2011/0199361 | A1* | 8/2011 | Shin ....................... G06F 1/1616 345/211 |
| 2012/0299966 | A1* | 11/2012 | Kim ....................... H02J 17/00 345/660 |
| 2013/0050249 | A1* | 2/2013 | Grabowski ............. G06T 15/20 345/619 |
| 2013/0132471 | A1* | 5/2013 | Hattori ................... G06F 8/38 709/203 |
| 2014/0019873 | A1* | 1/2014 | Gupta ..................... G06F 9/4443 715/744 |
| 2015/0002411 | A1* | 1/2015 | Hwang ................. G06F 3/0416 345/173 |
| 2015/0046169 | A1* | 2/2015 | Yang ....................... G06F 3/167 704/275 |
| 2015/0109184 | A1* | 4/2015 | Komiya ................. G06F 3/1454 345/1.1 |
| 2015/0121300 | A1* | 4/2015 | Wang .................. G06F 3/04845 715/790 |
| 2015/0192989 | A1 | 7/2015 | Kim et al. |
| 2015/0213752 | A1 | 7/2015 | Huang et al. |
| 2015/0227291 | A1* | 8/2015 | Wang .................... G06F 3/0481 345/173 |
| 2016/0018942 | A1* | 1/2016 | Kang ..................... G06F 3/0488 345/173 |
| 2016/0086568 | A1* | 3/2016 | Imamura .................. G06F 3/16 345/643 |
| 2016/0117699 | A1* | 4/2016 | Tanabe .................. G06Q 30/02 705/7.32 |
| 2016/0133201 | A1* | 5/2016 | Border ................. G02B 27/283 345/694 |
| 2017/0064206 | A1* | 3/2017 | Ku ........................ H04M 1/0264 |
| 2017/0192062 | A1* | 7/2017 | Ding ..................... G01R 31/3682 |

FOREIGN PATENT DOCUMENTS

| | | |
|---|---|---|
| CN | 102298495 A | 12/2011 |
| CN | 102591582 A | 7/2012 |
| CN | 102799356 A | 11/2012 |
| CN | 102915201 A | 2/2013 |
| CN | 103677266 A | 3/2014 |
| JP | 2005-242631 A | 9/2005 |
| JP | 2008-271413 A | 11/2008 |
| KR | 10-2014-0008845 A | 1/2014 |
| KR | 10-2014-0061042 A | 5/2014 |
| KR | 10-2014-0118283 A | 10/2014 |

OTHER PUBLICATIONS

Written Opinion (PCT/ISA/237) dated Jan. 17, 2017, issued by the International Searching Authority in counterpart International Patent Application No. PCT/KR2016/011877.
Communication dated Jan. 30, 2018 by the State Intellectual Property Office of P.R. China in counterpart Chinese Patent Application No. 201510697510.3.
Communication dated May 14, 2018, issued by the European Patent Office in counterpart European Application No. 16857809.4.
Communication dated Nov. 5, 2018, issued by the State Intellectual Property Office of P.R. China in counterpart Chinese Application No. 201510697510.3.
Communication dated Apr. 11, 2019, issued by the State Intellectual Property Office of P.R. China in counterpart Chinese Application No. 201510697510.3.
Communication dated Jun. 25, 2019, issued by the European Patent Office in counterpart European Application No. 16 857 809.4.

* cited by examiner

FIG. 3A
FIG. 3B
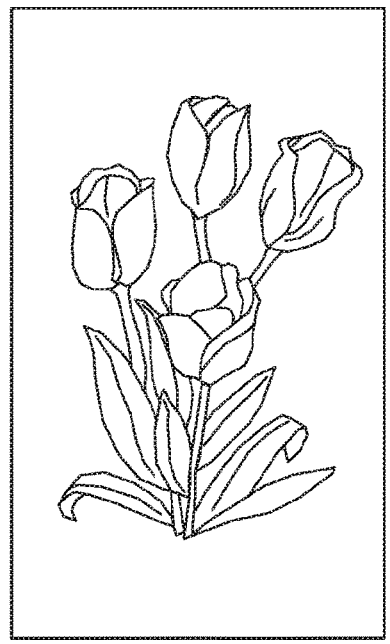
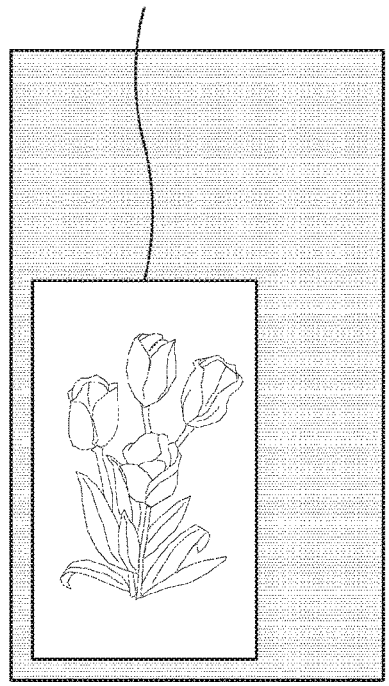
ACTIVATED REGION

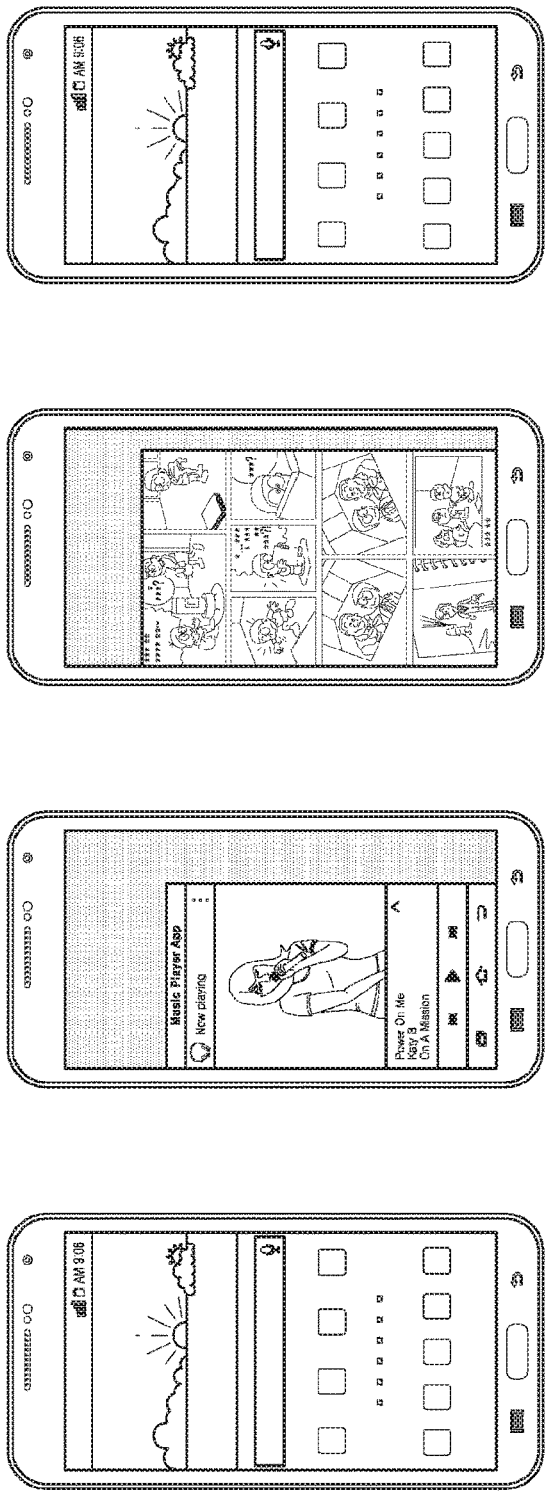

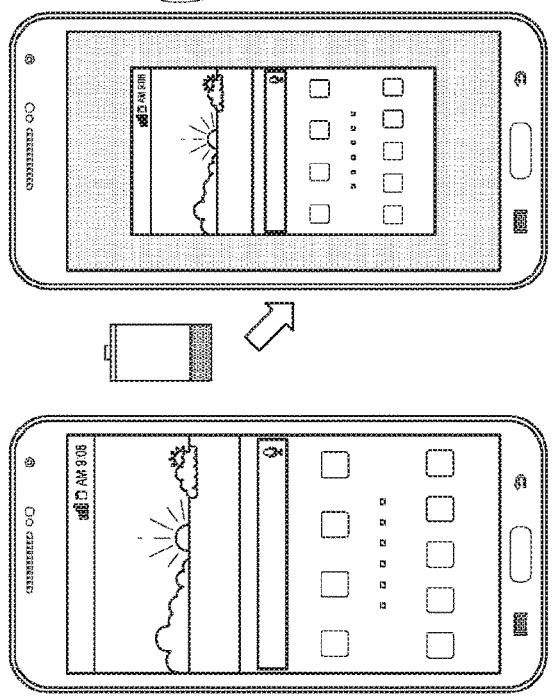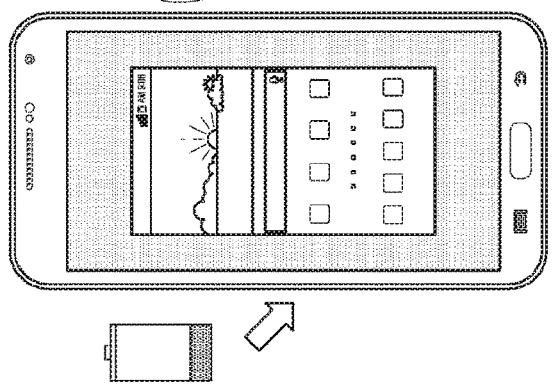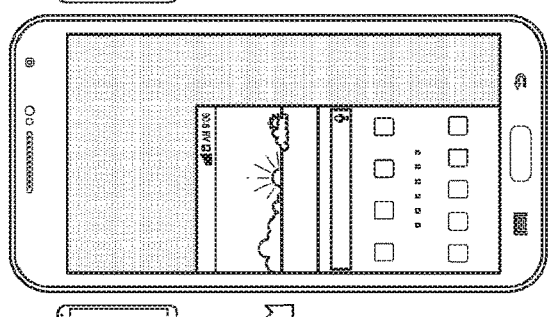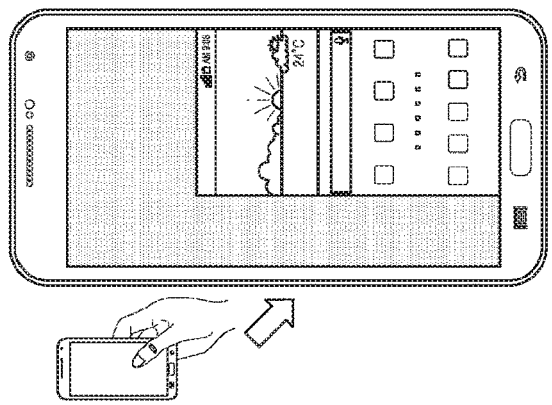

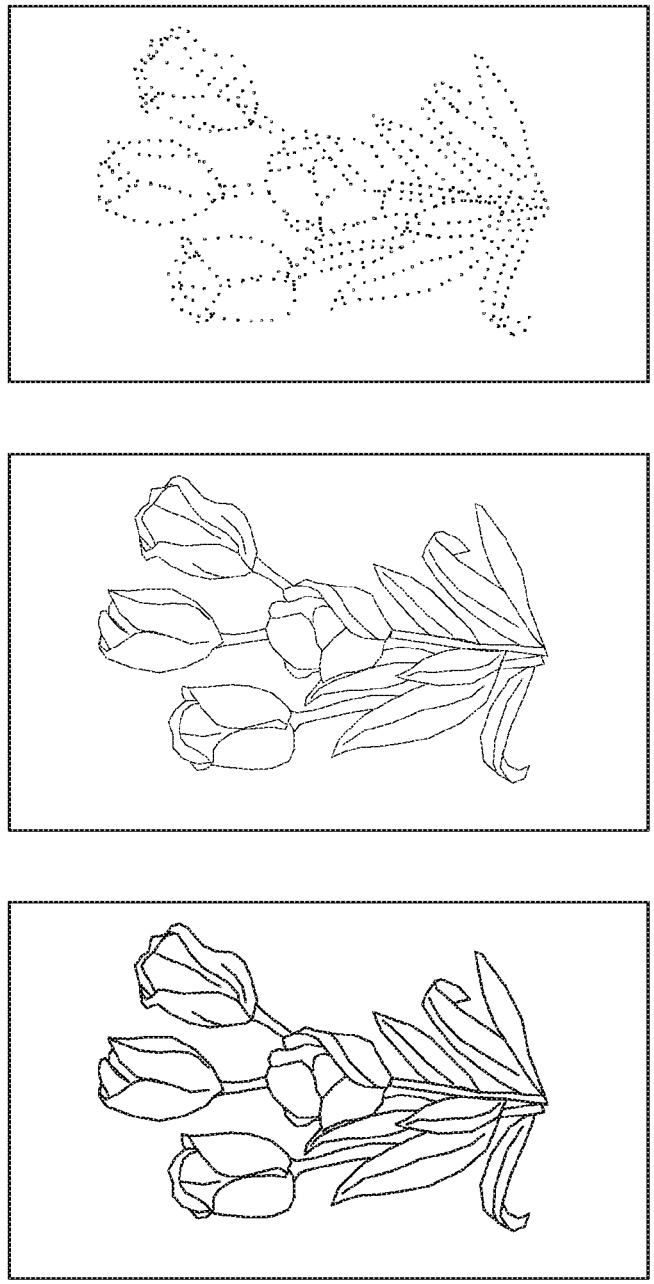

EXECUTION WINDOW OF APPLICATION

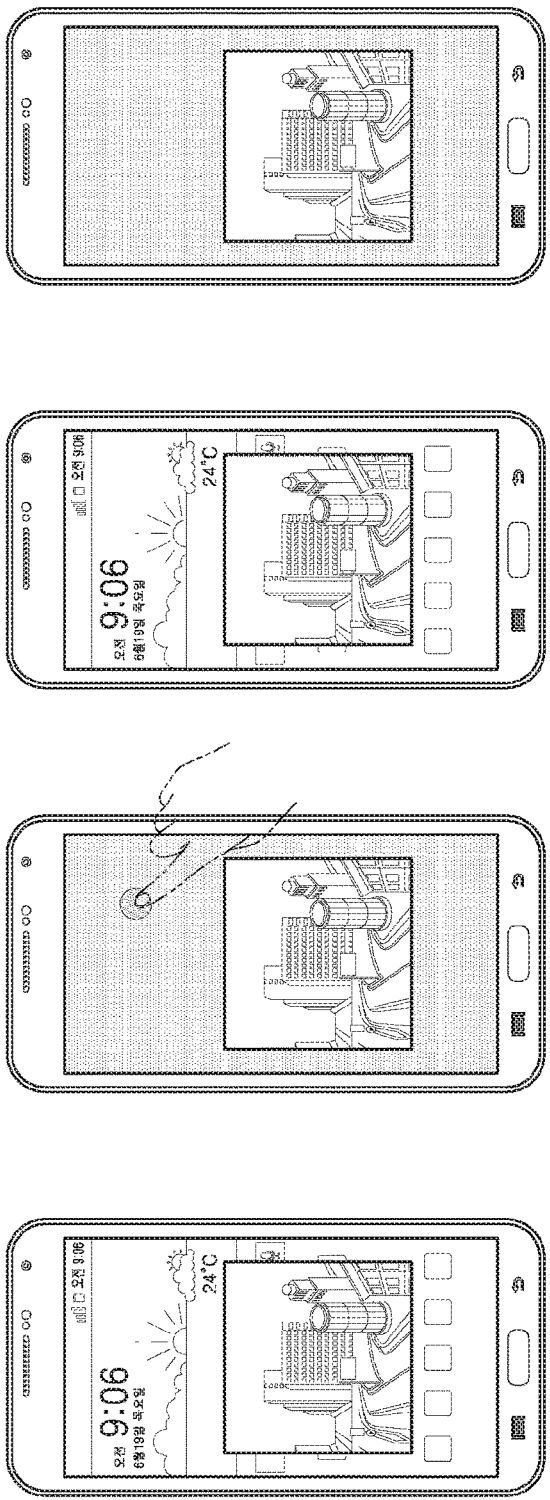

1500

1510

IMAGE DISPLAYING APPARATUS AND METHOD OF OPERATING THE SAME

CROSS-REFERENCE TO RELATED APPLICATIONS

This application claims priority from Chinese Patent Application No. 201510697510.3, filed on Oct. 23, 2015 in the Chinese Intellectual Property Office, and Korean Patent Application No. 10-2016-0130831, filed on Oct. 10, 2016 in the Korean Intellectual Property Office, the disclosures of which are incorporated herein by reference in their entireties.

BACKGROUND

1. Field

Apparatuses and methods consistent with exemplary embodiments relate to image displaying, and more particularly, to an image displaying apparatus that controls display of an application being executed in a terminal according to the state of the terminal, and a method of operating the image displaying apparatus.

2. Description of the Related Art

Capabilities of portable terminal devices, such as mobile phones, have recently improved, and, in particular, the hardware configuration of the displays of portable terminal devices has become better. For example, many portable terminal devices have high-quality displays, such as 1440p, but operation of high-quality displays may lead to higher power consumption. In addition, although mobile phones having a large screen and many applications are popular, they may be more difficult to operate with one hand of a user, while small-screen mobile phones may be easily operated with one hand of a user.

The large screens of portable terminal devices consume a lot of power. In particular, when portable terminal devices execute a plurality of applications at a high resolution, if the resolution is slightly lowered and there is no discernible difference between image qualities at the high resolution and a lowered resolution, the high resolution state may be considered wasteful power consumption.

SUMMARY

Exemplary embodiments may address at least the above problems and/or disadvantages and other disadvantages not described above. Also, the exemplary embodiments are not required to overcome the disadvantages described above, and may not overcome any of the problems described above.

Provided are image displaying apparatuses that control display of an application being executed in a terminal according to the state of the terminal, and methods of operating the image displaying apparatuses.

Additional aspects will be set forth in part in the description which follows and, in part, will be apparent from the description, or may be learned by practice of exemplary embodiments.

According to an aspect of an exemplary embodiment, there is provided a method of controlling a display, performed by an image displaying apparatus, the method including acquiring a screen parameter corresponding to an application that is being executed in a terminal; determining a partial region from within an entire region of a display of the terminal based on the acquired screen parameter; interrupting a supply of power to a remaining region of the entire region of the display except for the determined partial region; and displaying an execution window of the application in the determined partial region.

The method may further include acquiring a window parameter corresponding to the application that is being executed in the terminal; and determining a size of the execution window of the application based on the acquired window parameter, wherein the displaying of the execution window of the application may include displaying an execution window of the application having the determined size in at least a portion of the determined partial region.

The method may further include determining a location where the execution window of the application is to be displayed in the determined partial region based on the acquired window parameter, wherein the displaying of the execution window of the application may include displaying the execution window of the application at the determined location.

The method may further include acquiring a resolution parameter corresponding to the application that is being executed in the terminal; and changing at least one among a resolution of the execution window of the application and a resolution of the determined partial region, based on the acquired resolution parameter.

The method may further include determining whether the terminal is held in one hand of a user; changing the determined partial region according to whether the terminal is held in one hand of the user; interrupting a supply of power to a remaining region of the entire region of the display except for the changed partial region; and displaying the execution window of the application in the changed partial region.

The method may further include determining a size of the execution window of the application, according to whether the terminal is held in one hand of the user; and displaying an execution window of the application having the determined size.

The method may further include determining a location where the execution window of the application is to be displayed according to whether the terminal is held in one hand of the user; and displaying the execution window of the application at the determined location.

The method may further include checking a remaining capacity of a battery of the terminal; changing the determined partial region according to the checked remaining capacity of the battery; interrupting a supply of power to a remaining region of the entire region of the display except for the changed partial region; and displaying the execution window of the application in the changed partial region.

The method may further include determining a size of the execution window of the application according to the remaining capacity of the battery; and displaying the execution window of the application having the determined size.

The method may further include determining a location where the execution window of the application is to be displayed according to the remaining capacity of the battery; and displaying the execution window of the application at the determined location.

According to an aspect of another exemplary embodiment, there is provided an image displaying apparatus including a display; and a controller configured to: acquire a screen parameter corresponding to an application currently being executed in a terminal; determine a partial region from within an entire region of the display of the terminal based on the acquired screen parameter; interrupt a supply of power to a remaining region of the entire region of the display except for the determined partial region; and control the display to display an execution window of the application in the determined partial region.

The controller may be further configured to: acquire a window parameter corresponding to the application currently being executed in the terminal; determine a size of the execution window of the application by using the acquired window parameter; and display the execution window of the application in at least a portion of the determined partial region.

The controller may be further configured to determine a location where the execution window of the application is to be displayed in the determined partial region based on the acquired window parameter, and control the display to display the execution window of the application at the determined location.

The controller may be further configured to acquire a resolution parameter corresponding to the application currently being executed in the terminal and change at least one among a resolution of the execution window of the application and a resolution of the determined partial region, based on the acquired resolution parameter.

The controller may be further configured to: determine whether the terminal is held in one hand of a user; change the determined partial region within the entire region of the display according to whether the terminal is held in one hand of the user; interrupt a supply of power to a remaining region of the entire region of the display except for the changed partial region; and control the display to display the execution window of the application on the changed partial region.

The controller may be further configured to determine a size of the execution window of the application according to whether the terminal is held in one hand of the user, and control the display to display the execution window of the application having the determined size.

The controller may be further configured to determine a location where the execution window of the application is to be displayed according to whether the terminal is held in one hand of the user, and control the display to display the execution window of the application at the determined location.

The controller may be further configured to: determine a remaining capacity of a battery of the terminal; change the determined partial region within the entire region of the display according to the remaining capacity of the battery of the terminal; interrupt a supply of power to a remaining region within the entire region of the display except for the changed partial region; and control the display to display the execution window of the application in the changed partial region.

The controller may be further configured to determine a size of the execution window of the application according to the remaining capacity of the battery of the terminal and control the display to display the execution window of the application having the determined size.

The controller may be further configured to determine a location where the execution window of the application is to be displayed according to the remaining capacity of the battery of the terminal, and control the display to display the execution window of the application at the determined location.

According to an aspect of another exemplary embodiment, there is provided a non-transitory computer-readable recording medium that has recorded thereon a computer program, which, when executed by a computer, performs the above-described method.

BRIEF DESCRIPTION OF THE DRAWINGS

These and/or other aspects will become apparent and more readily appreciated from the following description of the exemplary embodiments, taken in conjunction with the accompanying drawings in which:

FIGS. 3A and 3B illustrate an activated region from within the entire region of a display of a terminal based on a screen parameter, according to an exemplary embodiment;

FIGS. 5A, 5B, 5C and 5D illustrate an example in which a region to be activated is determined based on a screen parameter set for each application;

FIGS. 7A, 7B, 7C and 7D illustrate applications that are displayed on a terminal device when a user of the terminal device holds the terminal device in one hand and when the remaining capacity of the battery of the terminal device is within a predetermined threshold range, according to another exemplary embodiment;

FIGS. 10A, 10B, and 10C illustrate an example in which a resolution of an application is changed according to the remaining capacity of the battery of a terminal device;

FIGS. 13A, 13B, 13C and 13D illustrate an exemplary embodiment in which a plurality of applications are classified into a foreground application and a background application and an execution window of the background application is deactivated;

DETAILED DESCRIPTION OF EXEMPLARY EMBODIMENTS

Figure 1A:
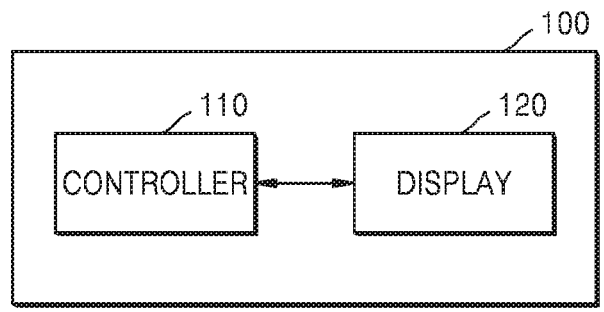
FIG. 1A is a block diagram illustrating a terminal device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components.

Although general terms widely used at present were selected for describing the exemplary embodiments in consideration of the functions thereof, these general terms may vary according to intentions of one of ordinary skill in the art, case precedents, the advent of new technologies, and the like.

The aforementioned embodiments may be described in terms of functional block components and various processing steps. Some or all of such functional blocks may be realized by any number of hardware and/or software components configured to perform the specified functions. For example, functional blocks according to exemplary embodiments may be realized by one or more microprocessors or by circuit components for a predetermined function. In addition, for example, functional blocks according to exemplary embodiments may be implemented with any programming or scripting language. The functional blocks may be implemented in algorithms that are executed on one or more processors. Furthermore, the exemplary embodiments described herein could employ any number of conventional techniques for electronics configuration, signal processing and/or control, data processing and the like. The words "mechanism," "element," "means," and "configuration" are used broadly and are not limited to mechanical or physical embodiments, Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

Exemplary embodiments will now be described more fully with reference to the accompanying drawings.

FIG. 1A is a block diagram of a terminal device 100 according to an exemplary embodiment. Referring to FIG. 1A, the terminal device 100 includes a controller 110 and a display 120. The terminal device 100 may be implemented by more components than those illustrated in FIG. 1.

The controller 110 controls an overall operation of the terminal device 100 and signal transfer among the internal components of the terminal device 100 and processes data. When there is an input from a user or stored preset conditions are satisfied, the controller 110 may execute an operating system (OS) and various applications that are stored in a storage unit 290 (e.g., memory) of FIG. 1B.

According to an exemplary embodiment, the controller 110 may control the display 120 to acquire a screen parameter corresponding to an application currently being executed in the terminal device 100, to determine a partial region within the entire region of the display 120 of the terminal device 100 by using the acquired screen parameter, to interrupt supply of power to a remaining region except for the determined partial region, and to display an execution window of the application on the determined partial region.

According to an exemplary embodiment, the screen parameter may be information about a region desired to be specifically activated, from within the entire region of the display 120 of the terminal device 100, for example, a region to which power is applied. For example, the screen parameter may be a location or size of a region on which the execution window of the application is to be activated. The screen parameter may be set by a manufacturer or a user of the terminal device 100, but exemplary embodiments are not limited thereto.

According to an exemplary embodiment, the controller 110 may set a screen parameter for each application. For example, when the terminal device 100 executes a plurality of applications, the controller 110 may set respective screen parameters for the plurality of applications. Accordingly, when an application being executed is switched to another application, the controller 110 may display the other application on the display 120 by using the screen parameter set for the application to be switched.

According to an exemplary embodiment, the controller 110 may set a screen parameter according to a remaining capacity of a battery of the terminal device 100.

According to an exemplary embodiment, the controller 110 may set a screen parameter according to whether the terminal device 100 was held in the right or left hand of the user.

According to an exemplary embodiment, the controller 110 may also control the display 120 to acquire a window parameter corresponding to the application currently being executed in the terminal device 100, to determine a size of an execution window of the application by using the acquired window parameter, and to display an execution window of the application having the determined size.

According to an exemplary embodiment, the window parameter may include information about a region on which the execution window of a specific application is to be displayed within the to-be-activated region determined based on the screen parameter, from within the entire region of the display 120 of the terminal device 100. For example, the window parameter may be a location or size of the region on which the execution window of the application is to be displayed from an activated region of the display 120. For example, the window parameter may include a location or size of a region on which only a specific portion of the execution window of the application being displayed on the activated region is to be clipped and displayed. The window parameter may be set by the manufacturer or the user of the terminal device 100, but exemplary embodiments are not limited thereto.

According to an exemplary embodiment, the controller 110 may set a window parameter for each application. For example, when the terminal device 100 is executing a plurality of applications, the controller 110 may have respective window parameters for the plurality of applications. Accordingly, when an application being executed is switched to another application, the controller 110 may display the other application on the display 120 by using the window parameter set for the application to be switched.

According to an exemplary embodiment, the controller 110 may set a window parameter according to the remaining capacity of the battery of the terminal device 100.

According to an exemplary embodiment, the controller 110 may set a window parameter according to whether the terminal device 100 was held in the right or left hand of the user. According to an exemplary embodiment, the controller 110 may also control the display 120 to determine a location on which the execution window of the application is to be displayed on the partial region determined based on the screen parameter, by using the acquired window parameter, and control the display 120 to display the execution window of the application at the determined location on the determined partial region.

According to an exemplary embodiment, a resolution parameter may include information about a resolution of the region to be determined based on the screen parameter or the region on which the execution window of the application is displayed, which is to be determined based on the window parameter. For example, the resolution parameter may be the number of colors or bits that express the to-be-activated region of the entire region of the display 120 and/or the region on which the execution window of the application is to be displayed. The resolution parameter may be set by the manufacturer or the user of the terminal device 100, but exemplary embodiments are not limited thereto.

According to an exemplary embodiment, the controller 110 may set a resolution parameter for each application. For example, when the terminal device 100 is executing a plurality of applications, the controller 110 may set respective resolution parameters for the plurality of applications. Accordingly, when an application being executed is switched to another application, the controller 110 may display the other application on the display 120 by using the resolution parameter set for the application to be switched.

According to an exemplary embodiment, the controller 110 may set a resolution parameter according to the remaining capacity of the battery of the terminal device 100.

According to an exemplary embodiment, the controller 110 may set a resolution parameter according to whether the terminal device 100 was held in the right or left hand of the user.

According to an exemplary embodiment, the controller 110 may control the display 120 to acquire a resolution parameter corresponding to the application currently being executed in the terminal device 100, and control the display 120 to change at least one of a resolution of the execution window of the application and a resolution of the determined partial region, by using the acquired resolution parameter.

According to an exemplary embodiment, the controller 110 may control the display 120 to determine whether the terminal device 100 was held in one hand of the user, to change the determined partial region within the entire region of the display 120 according to a holding status of the terminal device 100, to interrupt supply of power to a remaining region except for the changed partial region, and to display the execution window of the application on the changed partial region.

According to an exemplary embodiment, the controller 110 may control the display 120 to determine a size of the execution window of the application according to the holding status of the terminal device 100, and control the display 120 to display an execution window of the application having the determined size.

According to an exemplary embodiment, the controller 110 may control the display 120 to determine a location where the execution window of the application is to be displayed, according to the holding status of the terminal device 100, and control the display 120 to display the execution window of the application at the determined location.

According to an exemplary embodiment, the controller 110 may control the display 120 to check the remaining capacity of the battery of the terminal device 100, to change the determined partial region within the entire region of the display 120 according to the checked remaining capacity of the battery, to interrupt supply of power to a remaining region except for the changed partial region, and to display the execution window of the application on the changed partial region.

According to an exemplary embodiment, the controller 110 may control the display 120 to determine a size of the execution window of the application according to the remaining capacity of the battery, and control the display 120 to display an execution window of the application having the determined size.

According to an exemplary embodiment, the controller 110 may control the display 120 to determine a location where the execution window of the application is to be displayed, according to the remaining capacity of the battery of the terminal device 100, and control the display 120 to display the execution window of the application at the determined location.

The display 120 generates a driving signal by converting an image signal, a data signal, an on-screen display (OSD) signal, and a control signal that are processed by the controller 110. The display 120 may be a plasma display panel (PDP), a liquid-crystal display (LCD), an organic light-emitting device (OLED), a flexible display, or a 3-dimensional (3D) display, etc. The display 120 may be configured as a touch screen, and thus may serve as an input device as well as an output device.

The display 120 may also display content (e.g., a moving picture) that is input via a communicator or an input/output (I/O) interface. The display 120 may output an image stored in a storage under the control of the controller 110.

According to an exemplary embodiment, the display 120 may determine the partial region from the entire region of the display 120 of the terminal device 100 by using the acquired screen parameter, activate the determined partial region, and interrupt the supply of power to the remaining region except for the determined partial region.

According to an exemplary embodiment, the display 120 may display the execution window of the specific application on the to-be-activated region determined based on the screen parameter from the entire region of the display 120 of the terminal device 100, by using the acquired window parameter.

Figure 1B:
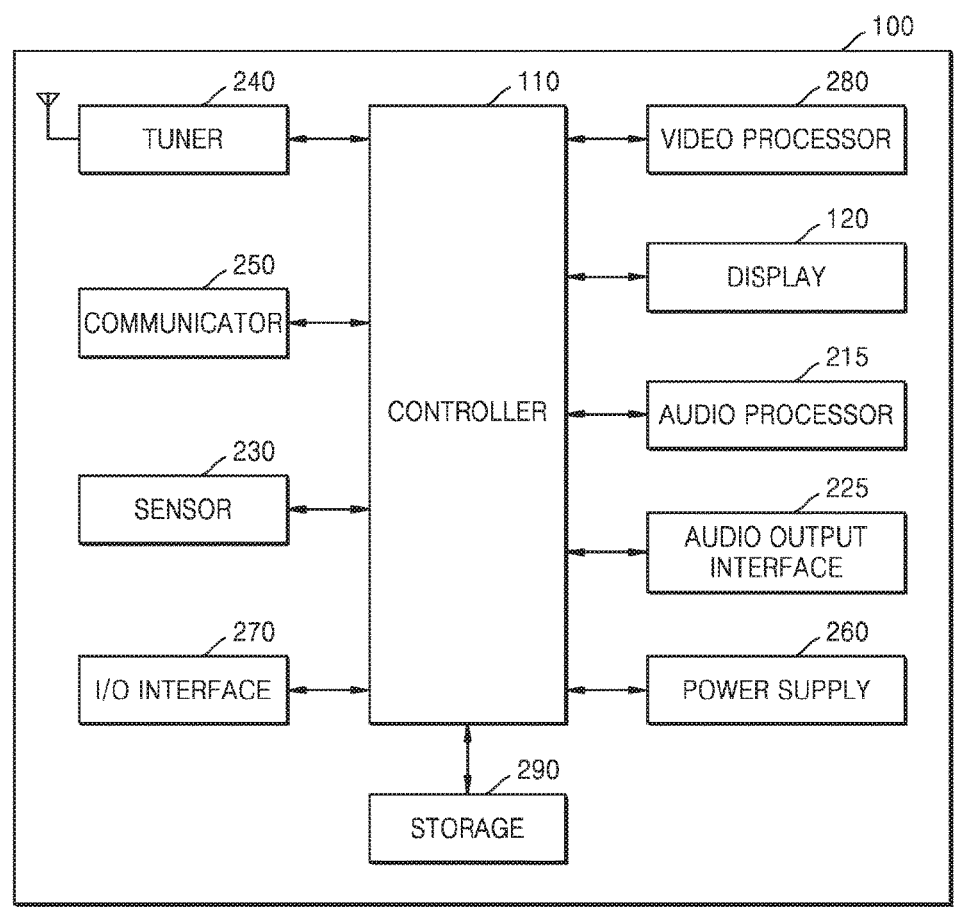
FIG. 1B is a block diagram illustrating a terminal device according to an exemplary embodiment.

FIG. 1B is a block diagram of a terminal device 100 according to another exemplary embodiment.

Referring to FIG. 1B, the terminal device 100 may include an audio processor 215, an audio output interface 225, a sensor 230, a tuner 240, a communicator 250, a power supply 260, an I/O interface 270, a video processor 280, and a storage 290 (e.g., memory), in addition to the controller 110 and the display 120.

The audio processor 215 processes audio data. The audio processor 215 may perform a variety of processing, such as decoding, amplification, or noise filtering, on the audio data. The audio processor 215 may include a plurality of audio processing modules to process audios corresponding to a plurality of pieces of content.

The audio output interface 225 outputs audio included in a broadcasting signal received via the tuner 240, under the control of the controller 110. The audio output interface 225 may also output audio (e.g., a voice or a sound) that is input via the communicator 250 or the I/O interface 270. The audio output interface 225 may also output audio stored in the storage 290 under the control of the controller 110.

The sensor 230 senses a voice of a user, an image of the user, and/or an interaction with the user, and may include a microphone, a camera, and/or a light receiver.

The tuner 240 may tune and select only a frequency of a channel which the terminal device 100 requests to receive from among many radio wave components that are obtained via amplification, mixing, resonance, and the like, of a wired or wireless broadcasting signal. The broadcasting signal includes audio, video, and additional information (e.g., an electronic program guide (EPG)). The tuner 140 may transmit or receive a cellular communication signal.

The communicator 250 may connect the terminal device 100 to an external apparatus (e.g., an audio apparatus) under the control of the controller 110. The controller 110 may transmit/receive content to/from the external apparatus connected via the communicator 250, download an application from the external apparatus, and/or perform web-browsing. The communicator 250 may receive a control signal of a control apparatus under the control of the controller 110. The control signal may be implemented as a Bluetooth signal and/or a Wi-Fi signal.

The communicator 250 may further include short-range communication (e.g., near field communication (NFC) or Bluetooth low energy (BLE)), in addition to Bluetooth.

The power supply 260 supplies power that is input from an external power source, to the internal components of the terminal device 100, under the control of the controller 110. The power supply 260 may also supply power that is output by one or more batteries located in the terminal device 100, to the internal components of the terminal device 100, under the control of the controller 110.

The I/O interface 270 receives video (e.g., a moving picture), audio (e.g., a voice or music), and additional information (e.g., an EPG) from outside the terminal device 100 under the control of the controller 110.

The video processor 280 processes video data that is received by the terminal device 100. The video processor 280 may perform a variety of image processing, such as decoding, scaling, noise filtering, frame rate transformation, and/or resolution transformation, on the received video data.

The storage 290 may store various data, programs, or applications for driving and controlling the terminal device 100 under the control of the controller 110. The storage 290 may store input/output signals and/or data corresponding to driving of the audio processor 215, the audio output interface 225, the sensor 230, the tuner 240, the communicator 250, the display 120, the power supply 260, the I/O interface 270, and/or the video processor 280. The storage 290 may store a control program for controlling the terminal device 100 and the controller 110, an application initially provided by a manufacturer or downloaded from outside the terminal device 100, a graphical user interface (GUI) associated with the application, objects (e.g., an image text, an icon, and a button) for providing the GUI, user information, a document, databases, and/or related pieces of data.

According to an exemplary embodiment, the term "storage" includes the storage 290, the ROM or the RAM of the controller 110, or a memory card (e.g., a micro SD card or a USB memory) mounted in the terminal device 100. The storage 290 may include a non-volatile memory, a volatile memory, a hard disk drive (HDD), and/or a solid state drive (SSD).

Figure 2:
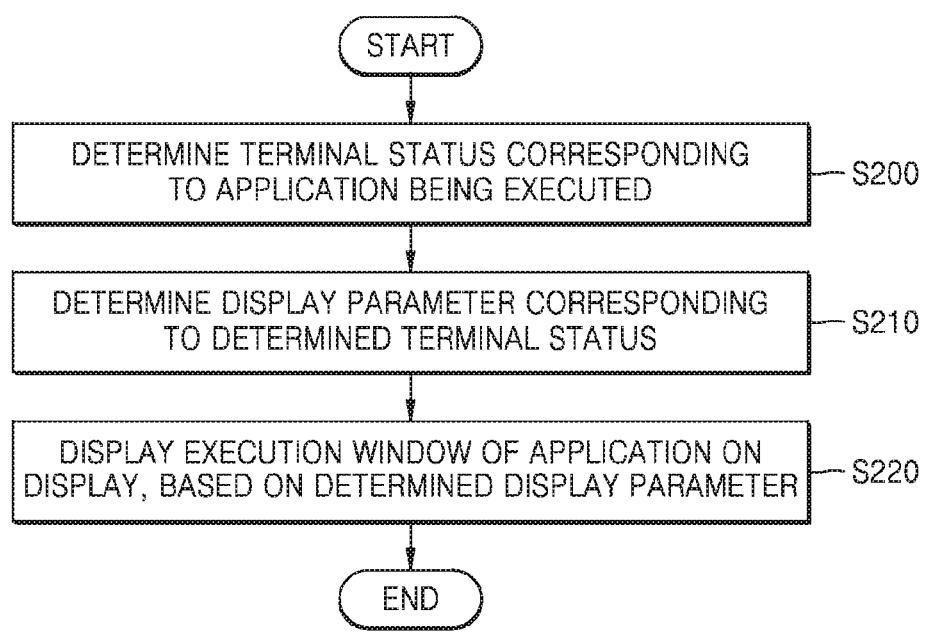
FIG. 2 is a flowchart illustrating a method of operating a terminal device, according to an exemplary embodiment.

FIG. 2 is a flowchart of a method of operating the terminal device 100, according to an exemplary embodiment.

In operation S200, the terminal device 100 may determine a terminal status corresponding to an application being executed.

According to an exemplary embodiment, first, a terminal status serving as a basis for controlling the display 120 may be pre-set by a manufacture and/or a user of the terminal device 100. Examples of the terminal status serving as a basis for controlling the display 120 include, but are not limited to, the remaining capacity of the battery of the terminal device 100, whether the terminal device 100 is held in one hand of the user, and whether the terminal device 100 is interested in only an application currently being used by the user from among a plurality of applications being executed in the terminal device 100.

According to an exemplary embodiment, the terminal device 100 may determine a terminal status with respect to an application being executed. For example, the terminal device 100 may determine whether the remaining capacity of the battery is within a certain threshold range, whether the terminal device 100 is held in the right or left hand of the user, and which portion, for example, an upper portion, a middle portion, or a lower portion, of the lateral side of the terminal device 100 is held by the user. The terminal device 100 may determine what application from among the plurality of applications being executed in the terminal device 100 is currently being used by the user, to thereby determine the currently-being-used application as a foreground application and determine the other applications as background applications. According to an exemplary embodiment, the terminal status that the terminal device 100 determines with respect to the application being executed may be pre-set by the manufacturer and/or the user, or may be automatically determined from a current usage status of the user with respect to the terminal device 100. For example, when a terminal status corresponding to an arbitrary application is previously set by the manufacturer and the user, the terminal device 100 may determine a screen parameter, a resolution parameter, and/or a window parameter in correspondence to the terminal status previously set when the application is executed, and may display an execution window of the application by using the determined parameter. When the terminal status corresponding to the arbitrary application is automatically determined from the current usage status of the user with respect to the terminal device 100, the terminal device 100 may determine a screen parameter, a resolution parameter, and/or a window parameter by taking into account the remaining capacity of the battery of the terminal device 100 when the application is executed and whether the terminal device 100 is held in one hand of the user, and may display an execution window of the application by using the determined parameter.

According to an exemplary embodiment, control of the display 120 according to the terminal status may vary according to the application being executed in the terminal device 100. For example, when two applications are being executed in the terminal device 100 while using a home screen image as a background, the terminal device 100 may determine terminal statuses respectively corresponding to the home screen image and the two applications. In a case in which the manufacture or the user does not previously set a terminal status with respect to an application, the terminal device 100 may determine the home screen image and the two applications to have a common terminal status. However, exemplary embodiments are not limited thereto. According to an exemplary embodiment, the terminal device 100 may classify the plurality of applications being executed into a foreground application and a background application, and may determine a terminal status for the foreground application and a terminal status for the background application. The foreground application may denote an application currently being used by the user. For example, when a game application is being executed on the home screen image of the terminal device 100, the terminal device 100 may determine the game application as a foreground application, determine the home screen image as a background application, and determine how to take into account the terminal status for each of the foreground application and the background application to control the display 120. When the remaining capacity of the battery is 50%, the terminal device 100 may determine respective resolutions of the foreground application and the background application to be different. For example, the terminal device 100 may activate only an execution window of the foreground application and may deactivate an execution window of the background application. For example, when a plurality of applications are being executed, the terminal device 100 may change an application included in the group of background applications to a foreground application.

According to an exemplary embodiment, even when terminal statuses for applications are the same, respective screen parameters, window parameters, and/or resolution parameters corresponding to the applications may be different.

According to an exemplary embodiment, the terminal device 100 may measure a percentage (%) of the remaining capacity of the battery relative to the entire capacity of a battery of the terminal device 100. For example, the terminal device 100 compares a battery level of the terminal device 100 with a plurality of threshold ranges. Each threshold range may represent the range of the remaining capacity of battery, and may be previously set by the user and/or the manufacturer. The plurality of threshold ranges may include, for example, a first threshold range, a second threshold range, and a third threshold range. As an example, the first threshold range may be a case in which the remaining capacity of the battery is between 90% and 100%, the second threshold range may be a case in which the remaining capacity of the battery is between 30% and 90%, and the third threshold range may be a case in which the remaining capacity of the battery is between 0% and 30%. However, exemplary embodiments are not limited thereto. By comparing the battery level of the terminal device 100 with the plurality of threshold ranges, the terminal device 100 may determine which threshold range the battery level of the terminal device 100 belongs to.

According to an exemplary embodiment, the terminal device 100 may determine whether the terminal device 100 is held by the user of the terminal device 100. The terminal device 100 may determine whether the terminal device 100 is held by the user, by using a sensor included in the terminal device 100. In this case, the sensor may include, for example, a vibration sensor, a gyro sensor, an acceleration sensor, a pressure sensor, a temperature sensor, and/or a touch sensor. The terminal device 100 may sense shaking of the terminal device 100, by using the sensor. The terminal device 100 may determine whether the terminal device 100 is held in the right or left hand of the user. For example, when a pressure of a user's hand applied to the lateral side of the terminal device 100 is measured to be at a predetermined level or greater by the pressure sensor or the like included in the terminal device 100, the terminal device 100 may determine whether the terminal device 100 is held in the right or left hand of the user. The terminal device 100 may determine what portion of the lateral side of the terminal device 100 is held in the right or left hand of the user, by using the pressure sensor or the like on the lateral side of the terminal device 100. For example, the terminal device 100 may divide the lateral side of the terminal device 100 into an upper portion, a middle portion, and a lower portion and may determine what portion of the lateral side of the terminal device 100 from among the three portions is held in the right or left hand of the user, but exemplary embodiments are not limited thereto.

In operation S210, the terminal device 100 may determine a display parameter corresponding to the application being executed. According to an exemplary embodiment, the display parameter may include at least one of the screen parameter, the resolution parameter, and the window parameter.

According to an exemplary embodiment, the screen parameter may include information about a region desired to be specifically activated from within the entire region of the display 120 of the terminal device 100, for example, a region to which power is applied. The resolution parameter may include information about a resolution of the region that is to be activated based on the screen parameter. The window parameter may include information about a region where an execution window of a specific application is to be displayed from the region that is to be activated based on the screen parameter.

According to an exemplary embodiment, the screen parameter, the resolution parameter, and the window parameter may be previously set by the user and the manufacturer.

In operation S220, the terminal device 100 may display an execution window of an application on the display 120, based on the determined display parameter.

According to an exemplary embodiment, the terminal device 100 may include information about the region desired to be specifically activated from within the entire region of the display 120 of the terminal device 100 based on the screen parameter. According to an exemplary embodiment, the terminal device 100 may change a resolution of the execution window of the application determined based on the window parameter or a resolution of a partial region activated based on the screen parameter, based on the resolution parameter. According to an exemplary embodiment, the terminal device 100 may determine a size of the execution window of the application based on the window parameter and may display the execution window of the application on a portion of the partial region activated based on the screen parameter.

FIGS. 3A and 3B illustrate an activated region from the entire region of a display of a terminal based on a screen parameter, according to an exemplary embodiment. According to an exemplary embodiment, the screen parameter may include information about a region desired to be specifically activated from within the entire region of the display of the terminal. For example, the screen parameter may include a size or location of the region desired to be activated. The size or location of the region desired to be activated may be set for each application.

Referring to FIG. 3A, an execution window of an application is displayed on the entire region of the display of the terminal. Referring to FIG. 3B, based on a screen parameter set by a user or a manufacturer of the terminal, the execution window of the application is displayed on an activated partial region from the entire region of the display of the terminal of FIG. 3A. At this time, supply of power to a remaining region except for the activated region may be interrupted.

FIGS. 4A-4D illustrate an example of setting or changing a screen parameter corresponding to an execution window of a specific application in response to a user input.

Referring to FIGS. 4A-4D, a terminal user may set a screen parameter for an execution window of a current application. The screen parameter may include a size or location of a region desired to be activated from the entire region of the display of the terminal. The screen parameter may be stored in a terminal, and the screen parameter may be set for only a currently-being-executed application. Alternatively, the screen parameter may be set for each application.

Figure 4A:
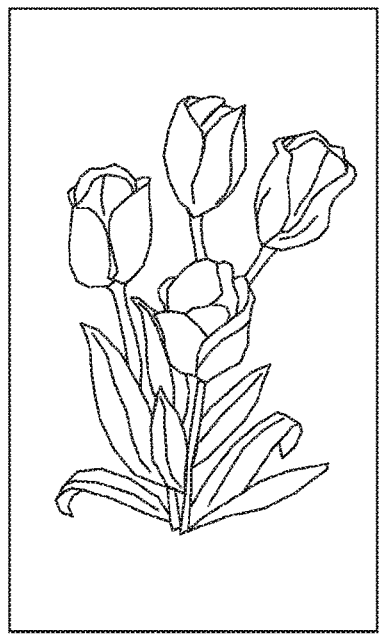
FIGS. 4A, 4B, 4C and 4D illustrate an example of setting or changing a screen parameter corresponding to an execution window of a specific application in response to a user input.
Figure 4B:
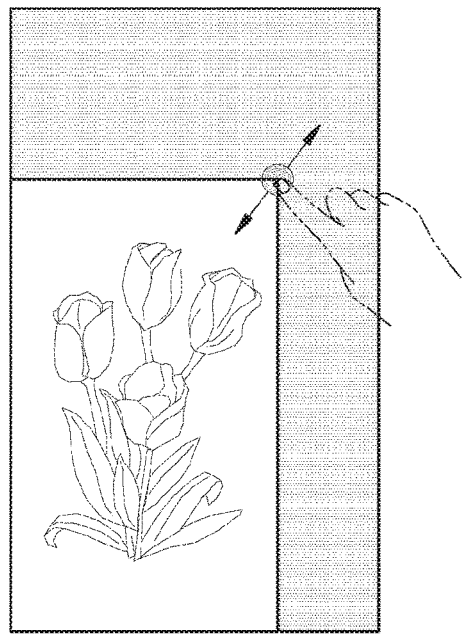
Figure 4C:
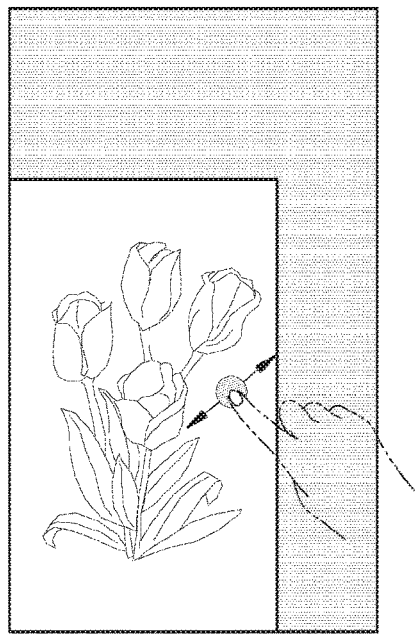

Referring to FIGS. 4A-4C, the terminal user may adjust the size of the execution window of the currently-being-executed application by dragging an edge of the execution window of the currently-being-executed application, as illustrated in FIG. 4B, or adjust a location of the execution window of the currently-being-executed application by touching an inside portion of the execution window of the currently-being-executed application, as illustrated in FIG. 4C, but exemplary embodiments are not limited thereto. The screen parameter may include information of the size or location of an execution window of the currently-being-executed application that is a result of the adjustment according to a user input.

Figure 4D:
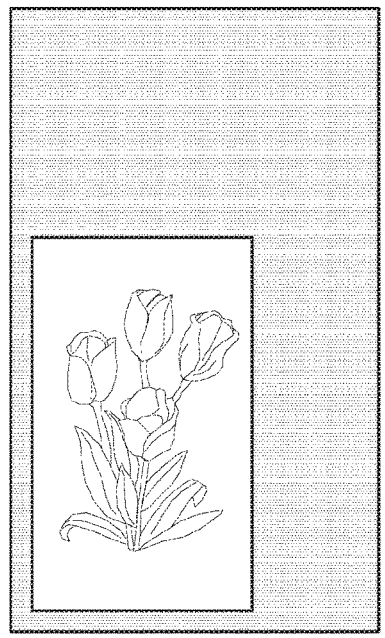

Referring to FIG. 4D, the terminal may display the execution window of the application, which was displayed in the entire region of the display of the terminal device in FIG. 4A, in a region resulting from the adjustment according to the user input. Accordingly, when the size of the execution window of the application that is displayed on the activated region is magnified by a certain size, the size of the execution window may become the size of the entire region of the display. A maximum size of the execution window of the application is the size of the entire region of the display of the terminal.

FIGS. 5A-5D illustrate an example in which a region to be activated is determined based on a screen parameter set for each application.

Referring to FIG. 5A, first, the terminal may display a home screen image including a plurality of icons on the entire region of the display of the terminal. The terminal may also display a specific application being executed, on the entire region of the display of the terminal. The home screen image or the specific application, which is displayed on the entire region of the display of the terminal, may be based on a screen parameter set by the manufacturer or the user, but exemplary embodiments are not limited thereto. Referring to FIG. 5B, when a first application is executed, the terminal may adjust a location and a size of a region to be activated, based on a screen parameter set for the first application, and display an execution window of the first application on an adjusted region. The screen parameter set for the first application may be a parameter set by the manufacturer and/or the user, or may be a parameter stored when the first application was executed before.

Referring to FIG. 5C, when a second application is executed, the terminal may adjust a location and a size of a region to be activated, based on a screen parameter set for the second application, and display an execution window of the second application on an adjusted region.

Referring to FIG. 5D, when all of the applications are terminated, the terminal may display the home screen image on the entire region of the display of the terminal.

According to an exemplary embodiment, screen parameters having different values may be set for different applications or for different statuses of the terminal.

According to an exemplary embodiment, the user may set different display parameters for different statuses of the terminal with respect to each application that is being executed in the terminal. When the terminal operates, the terminal may automatically determine a current status of the terminal. The terminal may also determine a screen parameter corresponding to the determined status of the terminal, and determine a region that is to be actually actuated from the entire region of the display of the terminal by using the determined screen parameter. The terminal may also determine a window parameter corresponding to the determined status of the terminal, and may change the location and size of an execution window of the application by using the determined window parameter.

Figure 6C:
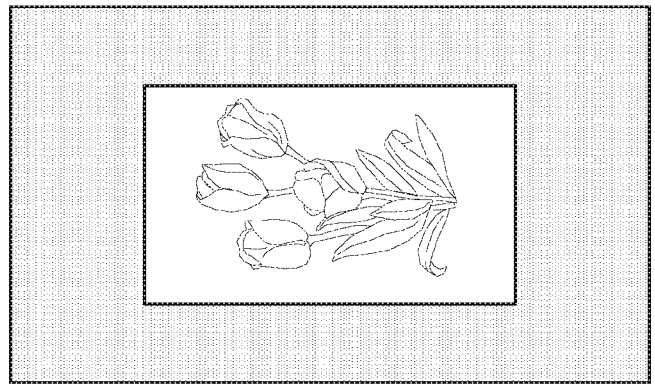
FIGS. 6A, 6B and 6C illustrate applications that are displayed on a terminal device when a user of the terminal device holds the terminal device in one hand and when a remaining capacity of a battery of the terminal device is within a predetermined threshold range, according to an exemplary embodiment.
Figure 6B:
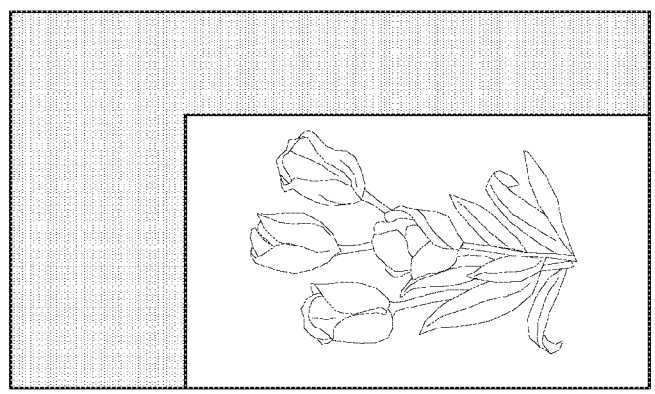
Figure 6A:
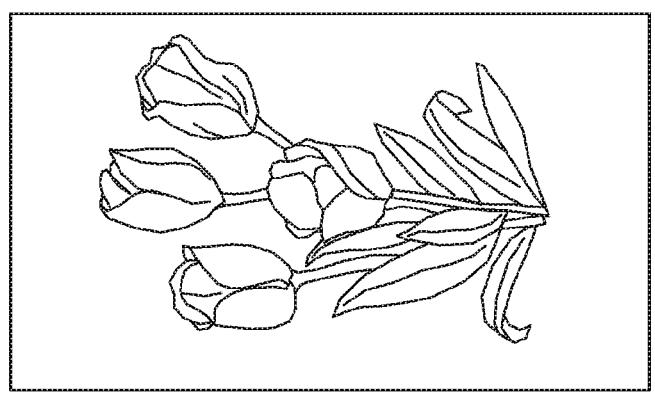

FIGS. 6A-6C illustrate applications that are displayed on the terminal when the user holds the terminal in one hand and when the remaining capacity of the battery is within a predetermined threshold range, according to an exemplary embodiment.

Referring to FIGS. 6A and 6B, when the user holds the terminal in the right or left hand, the terminal may determine whether the terminal is held by the user, by using a sensor included in the terminal. The terminal may determine whether the terminal is held in the right hand or left hand of the user. The terminal may determine that the left side of the terminal is held by the user, by using the sensor included in the terminal, and may also determine which portion of the lateral side of the terminal is held, by using the sensor included in the terminal. The terminal may display an application based on a screen parameter or window parameter corresponding to a status of the terminal in which a lower portion of the left side of the terminal is held. Accordingly, the terminal may adjust the execution window of the application to be positioned at an appropriate location according to a touch habit previously set by the user.

Referring to FIGS. 6A and 6C, when the remaining capacity of the battery of the terminal is within a third threshold range (e.g., when the remaining capacity of the battery are between 0% and 30%), the terminal may adjust the execution window of a currently-being-executed application based on a screen parameter, window parameter, or resolution parameter when the remaining capacity of the battery of the terminal in relation to the currently-being-executed application is within the third threshold range.

FIGS. 7A-7C illustrate applications that are displayed on the terminal when the user holds the terminal by one hand and when the remaining capacity of the battery is within a predetermined threshold range, according to another exemplary embodiment.

Referring to FIG. 7A, when the remaining capacity of the battery of the terminal is within a first threshold range (e.g., when the remaining capacity of the battery is between 90% and 100%), the terminal may display the home screen image on the entire region of the display. Referring to FIG. 7B, when the remaining capacity of the battery of the terminal is within a third threshold range (e.g., when the battery remains are between 0% and 30%), the terminal may activate only a partial region from the entire region of the display of the terminal and deactivate the remaining region, based on a screen parameter when the remaining capacity of the battery of the terminal in relation to the home screen image is within the third threshold range. For example, the terminal may interrupt the supply of power to the deactivated region to reduce power consumption of the terminal device. Referring to FIG. 7C, when the terminal has sensed a manipulation by the left hand of the terminal user, the terminal may activate only a partial region corresponding to a location of the left hand manipulation by adjusting the screen parameter. Referring to FIG. 7D, when the terminal has sensed a manipulation by the right hand of the terminal user, the terminal may activate only a partial region corresponding to a location of the right hand manipulation location by adjusting the screen parameter.

Figure 8A:
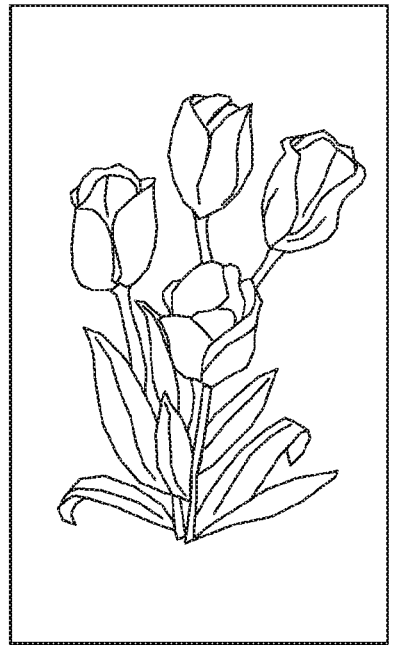
FIGS. 8A and 8B illustrate an example in which a resolution of an application being executed is adjusted based on a resolution parameter.
Figure 8B:
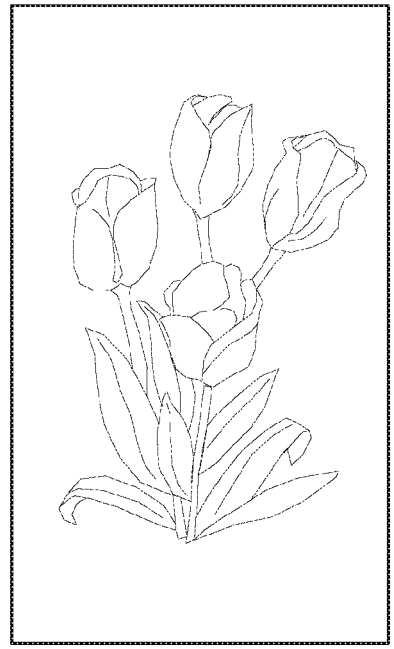

FIGS. 8A and 8B illustrate an example in which a resolution of an application being executed is adjusted based on a resolution parameter.

Referring to FIGS. 8A and 8B, an image is displayed on the display of the terminal, and a location or size of the image may be set based on a screen parameter or a window parameter. A resolution parameter applied to the image of FIG. 8B was set so that a resolution of the image of FIG. 8B is lower than a resolution corresponding to a resolution parameter applied to the image of FIG. 8A.

Figure 9A:
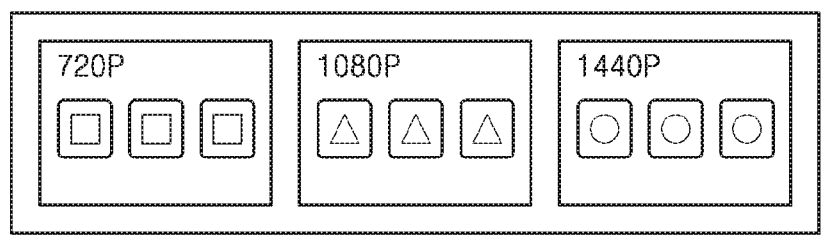
FIGS. 9A and 9B illustrate an application resolution list set for each type of application, according to an exemplary embodiment.
Figure 9B:
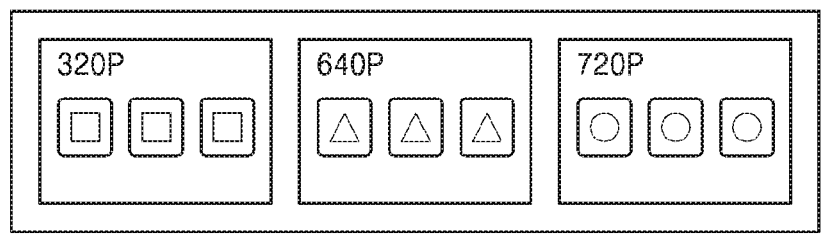

FIGS. 9A and 9B illustrate an application resolution list set for each type of application, according to an exemplary embodiment.

FIG. 9A illustrates a resolution list of an application when the remaining capacity of the battery of the terminal are within a first threshold range (e.g., when the battery remains is between 80% and 100%). FIG. 9B illustrates a resolution list of an application when the remaining capacity of the battery of the terminal is within a third threshold range (e.g., when the remaining capacity of the battery is between 0% and 30%). Resolutions for each application of FIG. 9B are lower than those of FIG. 9A.

FIGS. 10A, 10B, and 10C illustrate an example in which a resolution of an application is changed according to the remaining capacity of the battery of the terminal.

Referring to FIGS. 10A-10C, a resolution (FIG. 10B) of an application when the remaining capacity of the battery is within a second threshold range is lower than a resolution (FIG. 10A) of the application when the remaining capacity of the battery is within a first threshold range or the terminal is powered on, and a resolution (FIG. 10C) of the application when the remaining capacity of the battery is within a third threshold range is lower than the resolutions (FIGS. 10A and 10B) of the application.

Figure 11B:
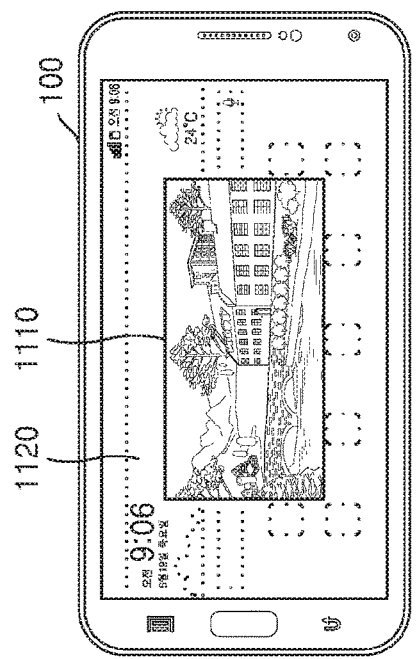
FIGS. 11A and 11B illustrate an exemplary embodiment in which a plurality of applications are classified into a foreground application and a background application and an execution window of the foreground application and an execution window of the background application are displayed on a terminal device based on respective parameters of the foreground and background applications.
Figure 11A:
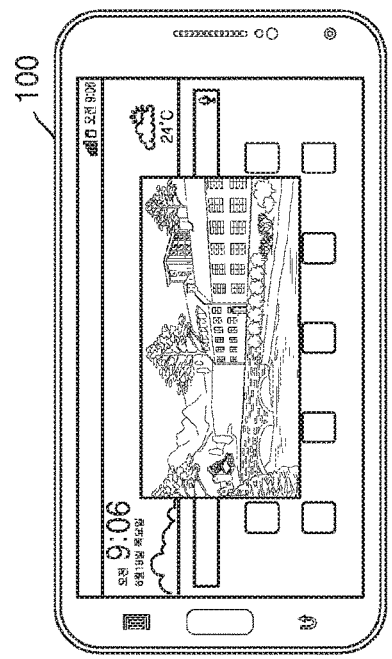

FIGS. 11A and 11B illustrate an exemplary embodiment in which a plurality of applications are classified into a foreground application and a background application and an execution window of the foreground application and an execution window of the background application are displayed on the terminal based on respective parameters of the foreground and background applications.

According to an exemplary embodiment, the terminal may set a resolution of a region where the foreground application is displayed to be relatively higher than a resolution of a region where the background application is displayed, based on a resolution parameter. The terminal may set the resolution of the display region of the background application to be relatively lower than the resolution of the display region of the foreground application to reduce power consumption. Referring to FIG. 11A, the terminal device 100 displays all of applications currently being used by the user and a home screen image at a resolution of 1080p without distinguishing a foreground application from a background application. Referring to FIG. 11B, the terminal device 100 may determine an application currently being used by the user as a foreground application 1110, determine the home screen image as a background application 1120, display the foreground application at a resolution of 1080p based on a resolution parameter corresponding to the foreground application, and display the background application at a resolution of 720p based on a resolution parameter corresponding to the background application.

Figure 12A:
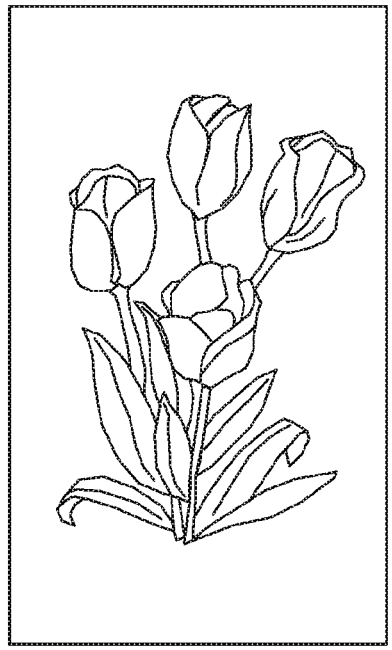
FIGS. 12A and 12B illustrate an example in which an application is displayed on a terminal device based on a window parameter.
Figure 12B:
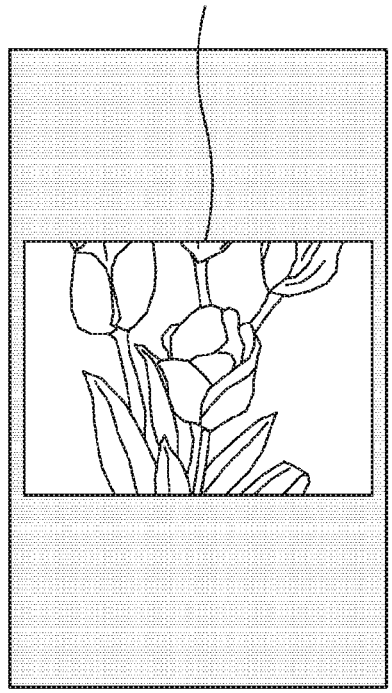

FIGS. 12A and 12B illustrate an example in which an application is displayed on the terminal device 100 based on a window parameter.

According to an exemplary embodiment, the window parameter may include information about a region in which the execution window of a specific application is to be displayed from within the to-be-activated region determined based on the screen parameter, from within the entire region of the display 120 of the terminal device 100. For example, the window parameter may be a location or size of a region on which the execution window of an application is to be displayed from the to-be-activated region of the entire region of the display 120. For example, the window parameter may include a location or size of a region on which only a specific portion of the execution window of the application being displayed on the activated region is to be clipped and displayed. The window parameter may be set by the manufacturer or the user of the terminal device 100, but exemplary embodiments are not limited thereto.

Referring to FIGS. 12A and 12B, the terminal device 100 may clip only a specific portion from the execution window of an application (FIG. 12A) displayed on the entire region of the display 120, based on a preset window parameter for the application, and display only the clipped portion (FIG. 12B).

According to an exemplary embodiment, the classification of applications being executed in the terminal device 100 into foreground and background applications, and the determination of respective screen parameters, resolution parameters, or window parameters for the foreground and background applications may be previously set by the user or the manufacturer. For example, in response to a text message, the terminal device 100 may determine a text message window as a foreground application and determine a portion of the entire region of the display 120 except for the foreground application as a background application, to thereby activate only the foreground application and deactivate the background application.

FIGS. 13A-13D illustrate an exemplary embodiment in which a plurality of applications are classified into a foreground application and a background application and an execution window of the background application is deactivated.

Referring to FIGS. 13A-13D, the terminal device 100 may deactivate a region corresponding to a background application from among several applications that are being executed by the terminal device 100. For example, referring to FIG. 13A, the terminal device 100 may display all of a home screen image and an application currently being used by the user without distinguishing a foreground application from a background application. Referring to FIG. 13B, the terminal device 100 may determine the application currently being used by the user as a foreground application, determine the home screen image as a background application, and deactivate a region on which the background application is displayed, when no user inputs are made to the terminal device 100 for a certain period of time. Referring to FIG. 13C, when the terminal device 100 senses a user input with respect to the region on which the background application is displayed, the terminal device 100 may re-activate the deactivated region on which the background application is displayed. Referring to FIG. 13D, when no user inputs are made to the terminal device 100 for a certain period of time, the terminal device 100 may re-deactivate the activated region on which the background application is displayed.

Figure 14:
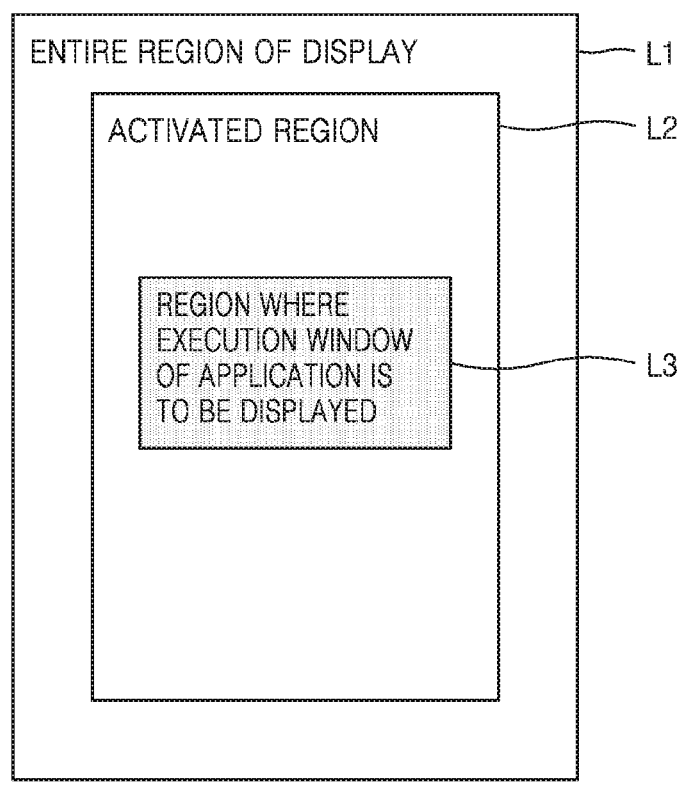
FIG. 14 illustrates a region, from within the entire region of a display of a terminal device, to which a display parameter is applied, according to an exemplary embodiment.

FIG. 14 illustrates a region to which a display parameter is applied from the entire region of the display of the terminal, according to an exemplary embodiment.

Referring to FIG. 14, it is assumed that the entire region of the display of the terminal is L1, an activated region from the entire region of the display of the terminal is L2, and a region where an execution window of an application is to be displayed from the activated region is L3. According to an exemplary embodiment, the user may see only an image corresponding to the region L3, a region of the region L1 except for the region L2 may be deactivated, and a region of the region L2 except for the region L3 may be activated but not displayed.

The regions L1 and L2 may have a zooming relationship. Scaling may be a ratio between the region to be activated and the entire region of the terminal display. A maximum value of the region L2 may be L1.

The regions L2 and L3 may have a clipping relationship. A maximum value of the region L3 may be L2.

According to an exemplary embodiment, even when a resolution parameter is applied to an application, a location and a size of an execution window of the application may not be changed.

FIGS. 15A-15F illustrate an example in which a screen parameter, a window parameter, and a resolution parameter are each applied to an application that is displayed on the terminal.

Figure 15A:
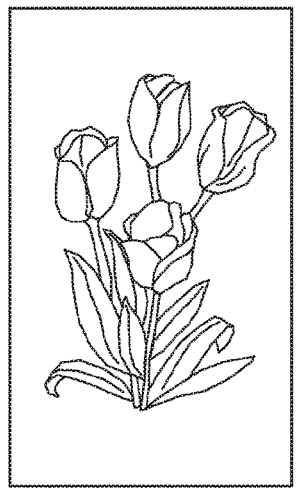
FIGS. 15A to 15F illustrate an example in which a screen parameter, a window parameter, and a resolution parameter are each applied to an application that is displayed on a terminal device.
Figure 15B:
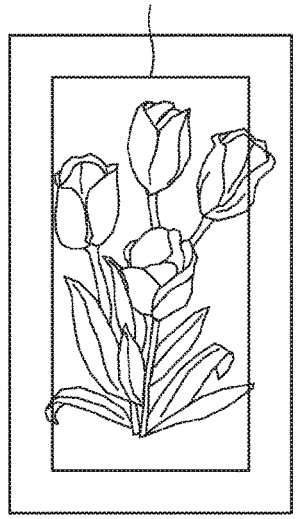
Figure 15C:
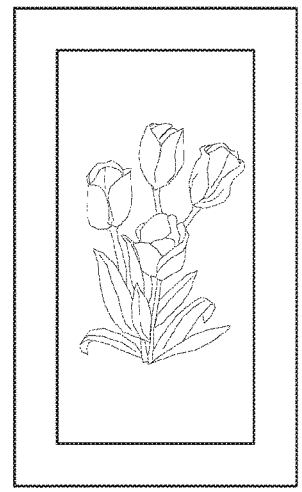
Figure 15D:
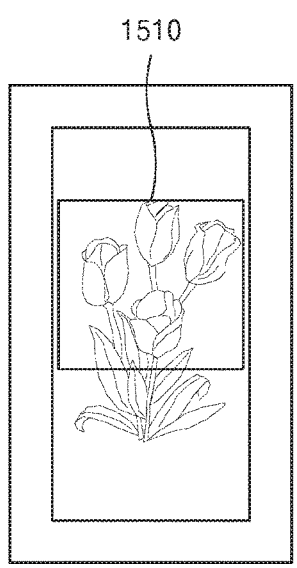
Figure 15E:
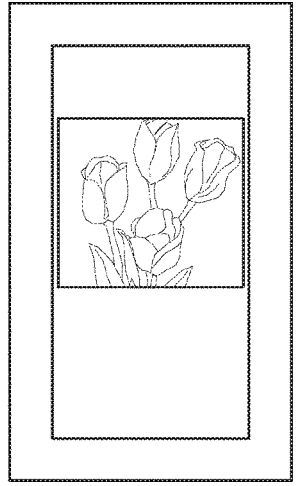
Figure 15F:
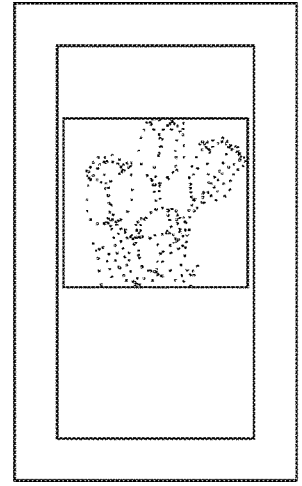

In FIG. 15A, an application is displayed on the entire region of the display of the terminal. In FIG. 15B, a region 1500 to be activated is determined from the entire region of the display of the terminal by using a screen parameter. In FIG. 15C, the application is scaled and displayed on the to-be-activated region determined in FIG. 15B. In FIG. 15D, a region on which the execution window of the application is to be displayed is determined from an activated region of FIG. 15C by using a window parameter. In FIG. 15E, the application is clipped and displayed on the region where the execution window of the application is to be displayed, which is determined in FIG. 15D. FIG. 15F illustrates a blurred image obtained by lowering a resolution of the application displayed in FIG. 15D by using the window parameter.

FIGS. 16A-16E illustrate a relationship among applications according to layers when only an execution window of a specific application from among several applications being executed in the terminal is adjusted.

Figures 16A, 16B:
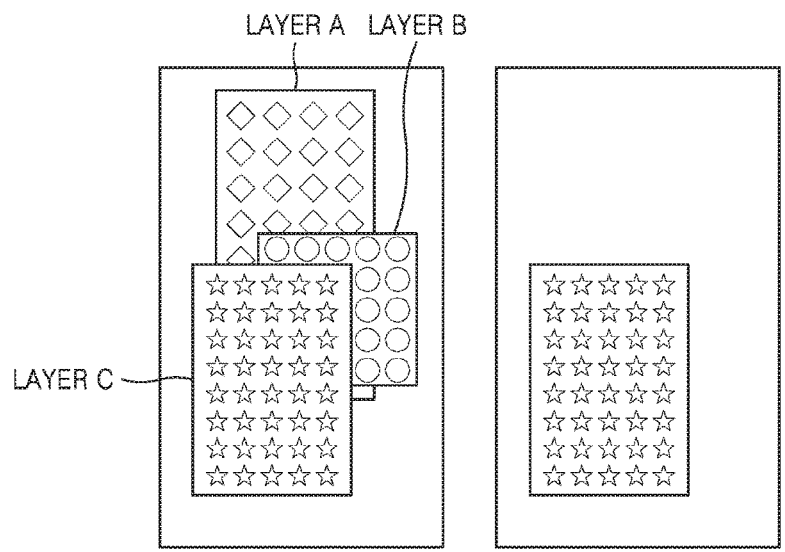
FIGS. 16A to 16E illustrate a relationship among applications according to layers when only an execution window of a specific application from among several applications being executed in a terminal device is adjusted.
Figures 16C, 16D, 16E:
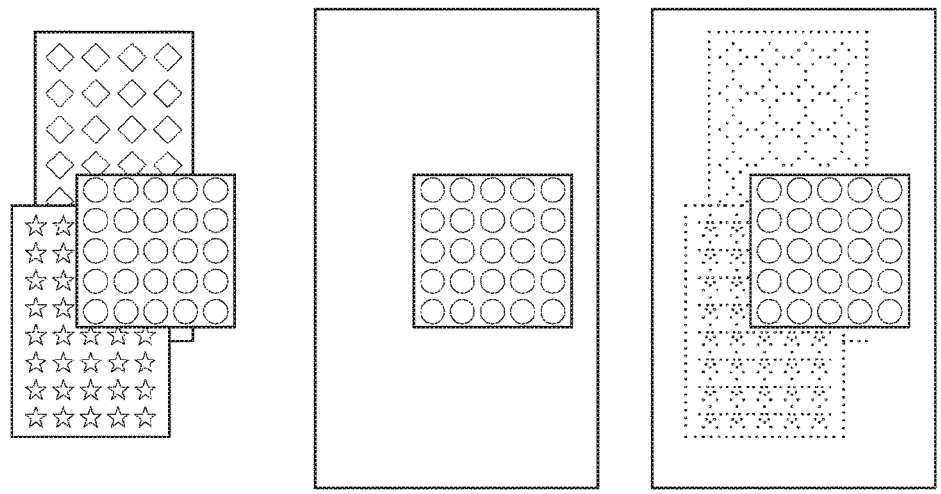

Referring to FIG. 16A, three layers being executed in the terminal are displayed. Each layer may denote an execution window of each application. In FIG. 16B, only an execution window of an application of a layer C from among the three applications being executed in the terminal is displayed. FIG. 16C illustrates a process of switching an application that is to be displayed on the terminal so that only an execution window of an application of a layer B is displayed on FIG. 16D. In FIG. 16D, only the execution window of the application of the layer B switched from FIG. 16A is displayed. FIG. 16E illustrates a result of adjusting a resolution of the execution window of the application of the layer B to 1080p and adjusting the resolutions of the execution windows of the applications of the layers A and C to 640p by using a resolution parameter.

Figure 17A:
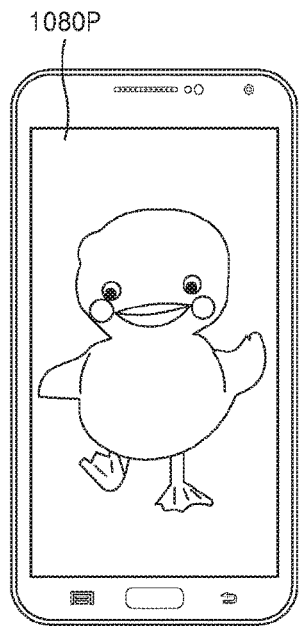
FIGS. 17A, 17B and 17C illustrate an example in which, when an application that is displayed on a terminal device is switched, a resolution parameter set for the application is applied.
Figure 17B:
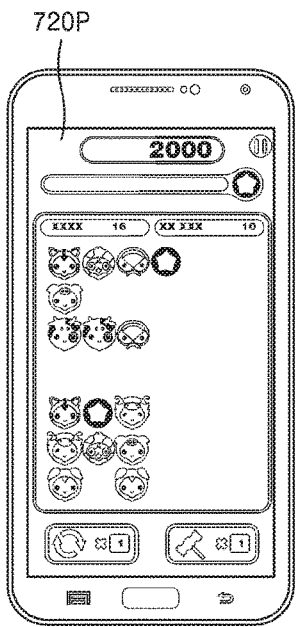
Figure 17C:
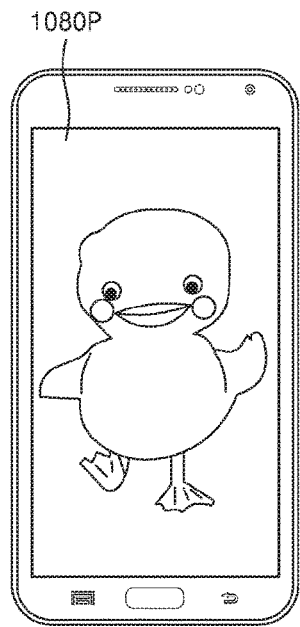

FIGS. 17A-17C illustrate an example in which, when an application that is displayed on the terminal is switched, a resolution parameter set for the application is applied.

FIG. 17A illustrates a first application displayed at a resolution of 1080p. FIG. 17B illustrates a second application displayed at a resolution of 720p. The second application may be different from the first application. In FIG. 17C, when the second application displayed in FIG. 17B is switched to the first application and the first application is displayed, the first application is displayed at the resolution of 1080p, which is pre-set as a resolution of the first application.

Figure 18A:
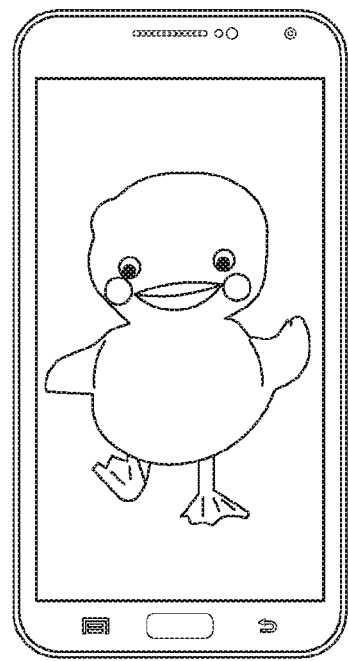
FIGS. 18A and 18B illustrate an example in which a resolution of an application is changed according to the remaining capacity of the battery of a terminal device.
Figure 18B:
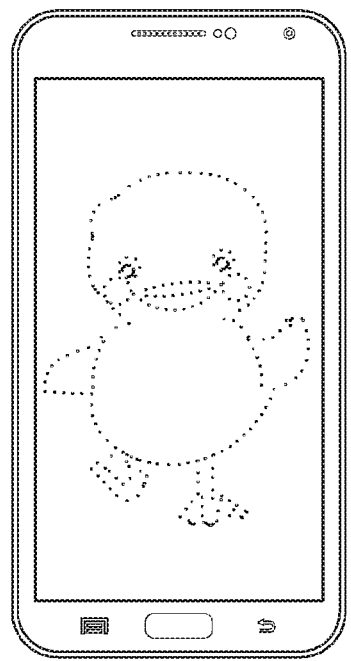

FIGS. 18A and 18B illustrate an example in which a resolution of an application is changed according to the remaining capacity of the battery of the terminal.

Referring to FIGS. 18A and 18B, when the remaining capacity of the battery of the terminal device 100 is changed from 90% (FIG. 18A) to 10% (FIG. 18B), the terminal device 100 may change a resolution of an execution window of an application from 1080p to 720p, based on a resolution parameter set according to a threshold range. Exemplary embodiments are not limited to these battery capacity ranges and display resolutions.

Figure 19A:
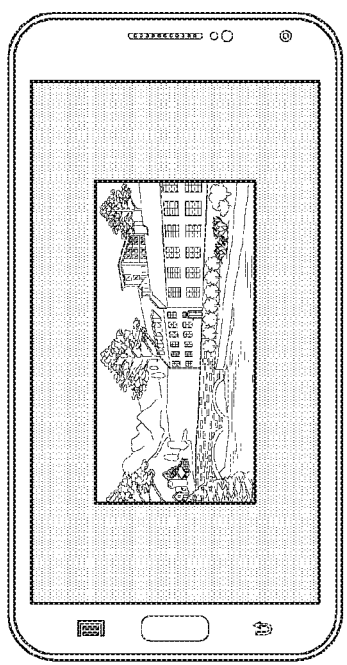
FIGS. 19A and 19B illustrate an example of a case in which the supply of power to a region except for a region on which an execution window of a specific application from among several applications being executed in a terminal device is interrupted.
Figure 19B:
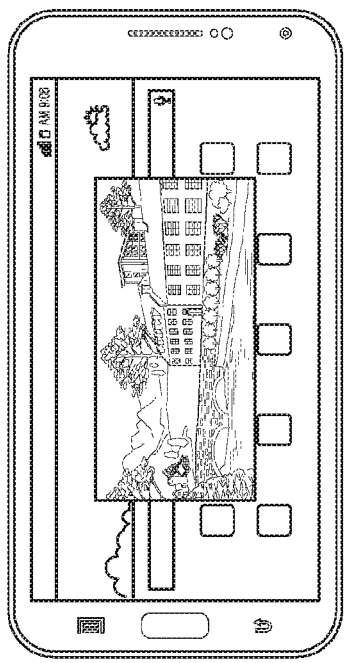

FIGS. 19A and 19B illustrate an example of a case in which the supply of power to a region except for a region on which an execution window of a specific application from among several applications being executed in the terminal is interrupted.

Referring to FIGS. 19A and 19B, a foreground application may be a moving picture, and the terminal device 100 may deactivate a region except for a region on which the moving picture is displayed.

The above-described exemplary embodiments can be written as computer programs and can be implemented in general-use digital computers that execute the programs using a non-transitory computer readable recording medium. A structure of the data used in the above-described exemplary embodiments may be recorded in a non-transitory computer readable recording medium via several means. The above-described exemplary embodiments can also be embodied as a storage medium including instruction codes executable by a computer such as a program module executed by the computer. For example, when software modules or algorithms are involved, these software modules may be stored as program instructions or computer readable and executable codes in a non-transitory computer-readable recording medium.

A non-transitory computer readable recording medium can be any recording medium which can be accessed by a computer and includes all volatile/non-volatile and removable/non-removable media. Examples of the non-transitory computer readable recording medium include, but are not limited to, magnetic storage media (e.g., ROM, floppy disks, hard disks, etc.), optical recording media (e.g., CD-ROMs, or DVDs), etc. Further, the non-transitory computer readable recording medium may include all computer storage and communication media.

A plurality of non-transitory computer readable recording media can be distributed over network coupled computer systems, and data stored in the distributed recording media, for example, program instruction words and codes, may be executed by at least one computer.

The particular implementations shown and described herein are illustrative exemplary embodiments and are not intended to otherwise limit the scope of exemplary embodiments in any way. For the sake of brevity, conventional electronics, control systems, software development and other functional aspects of the systems may not be described in detail.

The terms "... or(er)", "... interface", and "... module" when used herein refer to a unit in which at least one function or operation is performed, and may be implemented as hardware, software, or a combination of hardware and software.

The terms "... or(er)", "... interface", and "... module" may be stored in an addressable storage medium and may be implemented by a program that may be executed by a processor.

For example, the "... or(er)", "... interface", and "... module" may be implemented by object-oriented software components, class components, and task components, and processes, functions, attributes, procedures, subroutines, segments of a program code, drivers, firmware, a micro code, a circuit, data, a database, data structures, tables, arrays, and variables.

What is claimed is:

1. A method of controlling a display, performed by an image displaying apparatus, the method comprising:
   acquiring a screen parameter and a window parameter corresponding to an application that is being executed in a terminal;
   determining a remaining capacity of a battery of the terminal;
   determining which portion of the terminal is held by a user;
   determining a partial region of an entire region of a display of the terminal based on the acquired screen parameter, the determined remaining capacity of the battery, and the determined portion of the terminal;
   interrupting a supply of power to a remaining region of the entire region of the display except for the determined partial region; and
   displaying an application image of the application on an execution window of the application in the determined partial region by zooming out the application image based on the screen parameter and by clipping the application image that is zoomed out based on the window parameter,
   wherein a size of the determined partial region is smaller than the entire region of the display of the terminal, and
   wherein a size of the execution window is smaller than the size of the determined partial region.

2. The method of claim 1, further comprising:
   determining the size of the execution window of the application based on the acquired window parameter, and
   displaying the execution window of the application having the determined size in at least a portion of the determined partial region.

3. The method of claim 2, further comprising determining a location where the execution window of the application is to be displayed in the determined partial region based on the acquired window parameter,
   wherein the displaying of the execution window of the application comprises displaying the execution window of the application at the determined location.

4. The method of claim 3, further comprising:
   acquiring a resolution parameter corresponding to the application that is being executed in the terminal; and
   changing at least one among a resolution of the execution window of the application and a resolution of the determined partial region, based on the acquired resolution parameter.

5. The method of claim 1, further comprising:
   determining the size of the execution window of the application, according to the determined portion of the terminal; and
   displaying the execution window of the application having the determined size.

6. The method of claim 5, further comprising:
   determining a location where the execution window of the application is to be displayed according to the determined portion of the terminal; and
   displaying the execution window of the application at the determined location.

7. The method of claim 1, further comprising:
   determining the size of the execution window of the application according to the remaining capacity of the battery; and
   displaying the execution window of the application having the determined size.

8. The method of claim 7, further comprising:
   determining a location where the execution window of the application is to be displayed according to the remaining capacity of the battery; and
   displaying the execution window of the application at the determined location.

9. A non-transitory computer-readable recording medium having recorded thereon a computer program, which, when executed by a computer, performs the method of claim 1.

10. An image displaying apparatus comprising:
    a display; and
    a controller configured to:
       acquire a screen parameter and a window parameter corresponding to an application currently being executed in a terminal,
       determine a remaining capacity of a battery of the terminal,
       determine which portion of the terminal is held by a user,
       determine a partial region of an entire region of the display of the terminal based on the acquired screen parameter, the determined remaining capacity of the battery, and the determined portion of the terminal,
       interrupt a supply of power to a remaining region of the entire region of the display except for the determined partial region, and
       control the display to display an application image of the application on an execution window of the application in the determined partial region by zooming out the application image based on the screen parameter and by clipping the application image that is zoomed out based on the window parameter,
    wherein a size of the determined partial region is smaller than the entire region of the display of the terminal, and
    wherein a size of the execution window is smaller than the size of the determined partial region.

11. The image displaying apparatus of claim 10, wherein the controller is further configured to:
    determine the size of the execution window of the application by using the acquired window parameter, and display the execution window of the application in at least a portion of the determined partial region.

12. The image displaying apparatus of claim 11, wherein the controller is further configured to determine a location where the execution window of the application is to be displayed in the determined partial region based on the acquired window parameter, and control the display to display the execution window of the application at the determined location.

13. The image displaying apparatus of claim 12, wherein the controller is further configured to acquire a resolution parameter corresponding to the application currently being executed in the terminal and change at least one among a resolution of the execution window of the application and a resolution of the determined partial region, based on the acquired resolution parameter.

14. The image displaying apparatus of claim 10, wherein the controller is further configured to determine the size of the execution window of the application according to the determined portion of the terminal, and control the display to display the execution window of the application having the determined size.

15. The image displaying apparatus of claim 14, wherein the controller is further configured to determine a location where the execution window of the application is to be displayed according to the determined portion of the terminal, and control the display to display the execution window of the application at the determined location.

16. The image displaying apparatus of claim 10, wherein the controller is further configured to determine the size of the execution window of the application according to the remaining capacity of the battery of the terminal and control the display to display the execution window of the application having the determined size.

* * * * *